UNITED STATES PATENT OFFICE.

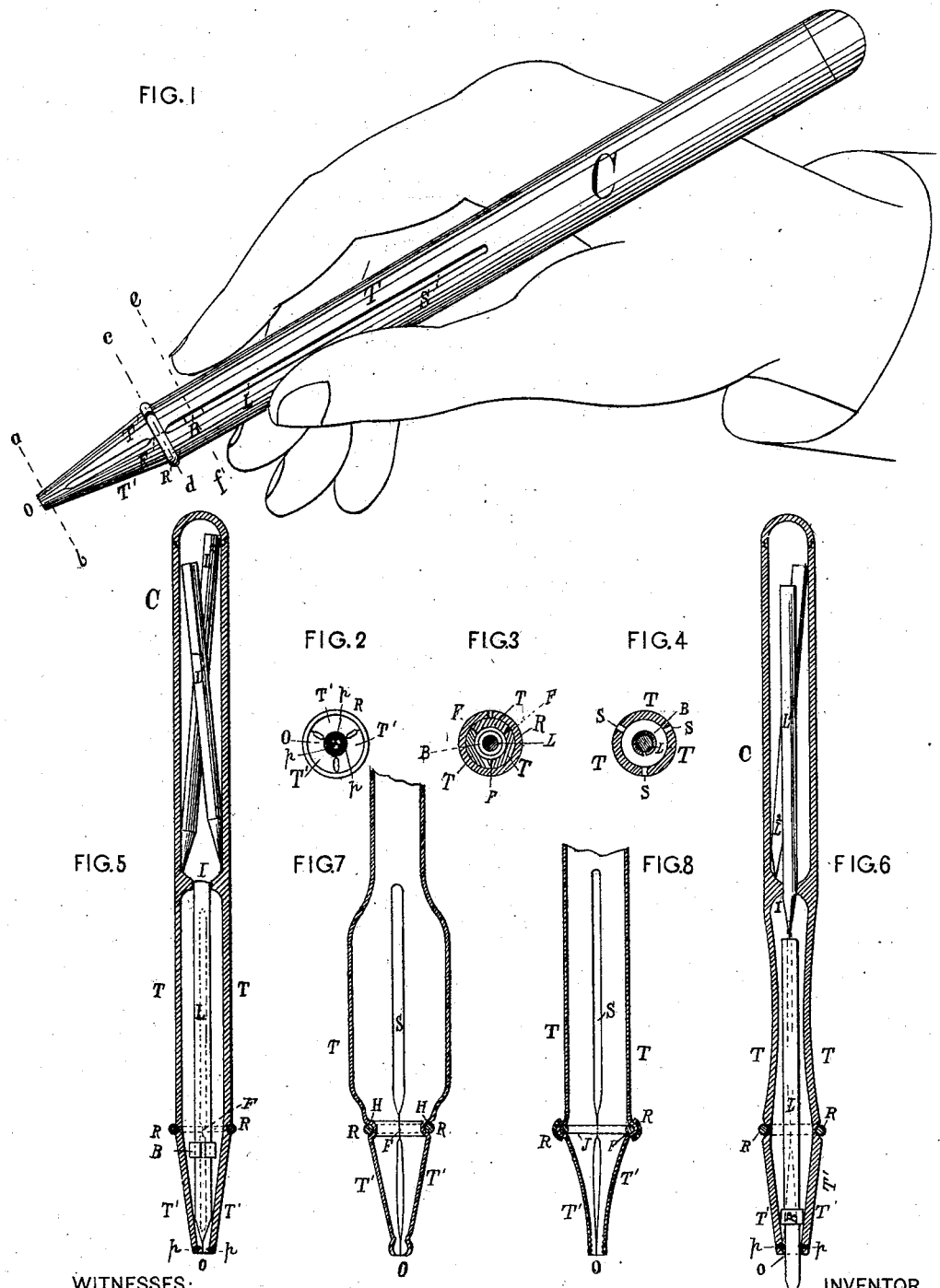

JOSHUA PUSEY, OF PHILADELPHIA, PENNSYLVANIA.

CRAYON-HOLDER.

SPECIFICATION forming part of Letters Patent No. 275,517, dated April 10, 1883.

Application filed March 22, 1882. (No model.)

*To all whom it may concern:*

Be it known that I, JOSHUA PUSEY, a citizen of the United States, residing at the city and county of Philadelphia, and State of Pennsylvania, have invented a new and useful Improvement in Crayon-Holders, of which the following is a specification, reference being had to the accompanying drawings, of which—

Figure 1 is a side elevation of one form of my holder as held in the hand in the usual position for writing, ready for operating the same to cause the protrusion of the crayon or lead therein contained, as hereinafter described. Fig. 2 is a transverse section thereof on the line *a b*, Fig. 1; Fig. 3, a similar section on the line *c d*; Fig. 4, a like section on the line *e f*; Fig. 5, a longitudinal central section thereof; Fig. 6, a like longitudinal section, with the crayon protruded from the holder, showing the position of the clamping mechanism holding the crayon after the pressure upon the tines above their fulcrums has been released. Figs. 7 and 8 are longitudinal sectional views of the lower ends of holders, having modifications of certain features, as hereinafter explained.

Similar letters of reference indicate corresponding parts where they occur in the several figures.

The nature of the invention will fully appear from the following description. Its object is to provide an automatic holder for crayons, leads, &c., cheaper and simpler in construction and in operation, and more handy to use than those heretofore known to me.

The implement may be made wholly or partly of metal, wood, or other suitable material. In the present instance the case C, Fig. 1, is a tube of some elastic material—such as hard vulcanized rubber—tapering and contracted toward its lower end, as shown. The upper end may be permanently closed or provided with any kind of stopper or cap, as of india-rubber, to serve as an eraser. A portion of the length of the case is divided into two or more—in the present instance three—elastic parts or tines, T T'. These are separated from each other a part of their length, leaving slots or spaces S between them, but are in contact at points F, thence converging, more or less in contact, to a tapering end, their inner sides, at and near their extremities, making a contracted opening, O.

It will be obvious that if the device be taken in hand in the usual position for writing, as in Fig. 1—that is, between the thumb and two fingers—and the elastic tines T are compressed toward each other above points F, as in Fig. 6, the parts T' thereof below these points will separate, and the orifice O become thereby enlarged. The tines act as levers of the first class, their fulcrums being at F, their short arms T' below, and their long arms T above, the fulcrums. Now, if the implement be placed in a perpendicular position, or slanting, as in Fig. 1, and the tines T be sufficiently compressed toward each other, the gravity of the crayon or lead L contained therein will cause it to descend through the opening O. It is of course presumed that when the tines are in normal position, as in Fig. 5, the said opening is so contracted that the crayon cannot escape. When the latter has protruded the desired distance the pressure upon the tines T is released, and their spring or elasticity causes the short arms T' to clamp the lead, as in Fig. 6. When desired, the lead may be released by squeezing the tines together, as before, and returned wholly within the case either upon reversing the position of the implement, so that the lead will drop back into the same, or by pressing the holder down against the paper or other surface, while the lead is thus released.

It is to be observed that the internal space included by the tines T should be such that when they are squeezed together they shall not touch the lead or crayon, at least not so as to bind the same, and thereby prevent it from sliding freely back and forth. The spring or resisting force of the tines T should exceed the force of any pressure that is ordinarily applied in merely holding or grasping the implement when writing with the crayon. Otherwise it is plain the latter might be continually sliding back into the case from the necessary pressure of the point of the crayon against the paper, &c., when in use, and the tool thereby be practically useless. I hold the tines together at or near their fulcrums by means of a band, R, which in the present instance is a split ring sprung into a groove. If this restraining-band be located below fulcrums F, it should have more or less spring, so that it may accommodate itself to the expansion and contraction of the clamping parts T'. It may also, in such case, more or less aid by its elasticity the firmness of the clamp upon the crayon.

It is manifestly desirable to limit the extent of the protrusion of the crayon beyond the orifice O, and to have the same adjustable. I accomplish this by means of a very simple and inexpensive device. (Shown in Figs. 1, 3, 4, 5, and 6.) It consists merely of a band or clasp, B, of metal, rubber, or other suitable material, embracing the crayon L, so as to remain where adjusted, and yet capable of being readily shifted up and down thereon. A thin split ring, elastic, is preferred. It checks the fall of the crayon at the desired point by striking against the contracted sides of the lower arms of the tines, as seen in Fig. 6, its diameter being such that it cannot pass through the exit O of the crayon, or at least not unless an extraordinary pressure is brought upon tines T and the said opening sufficiently enlarged. When the point of the crayon has worn away, or nearly so, and it is necessary to further or again extend the same, it is released from the clamp of the jaws T′, in the manner before described, and pulled out the desired distance by the ends of the fingers. When a new crayon or lead is to be inserted it may be done by way of the upper end of the case, the clasp B being taken out and slid onto the crayon. If, however, the upper end of the holder be permanently closed, this check-ring may be put in at the time the former is made, the crayons being afterward inserted by way of the opening O and passed into the check-ring, the latter being held meanwhile by means of a knife-blade, pin, &c., inserted between the tines; or the parts may be so made or proportioned that upon a comparatively great compression of tines T the opening O will enlarge sufficiently to permit the ring to pass through the same.

It will be obvious that this stop or check device is useful in combination with all lead or crayon holders having contractible and expansible clamping-jaws, wherein the lead falls outward between the jaws by its gravity when the holder is held in the suitable position; also, that the leads or crayons provided with the stop device and adapted for use in such holders may be sold separately from the latter.

The device just described, though usually very desirable, may, however, readily be dispensed with in connection with my improved holder, as the protrusion of the crayon may so handily be regulated by bringing its point against the paper or other surface at the moment of preparing to write and moving the holder from or toward the latter, while the crayon is at liberty to slide up and down through opening O.

If the tines T T′ be made of sheet metal, it is best to form in them an internal bead, H, Fig. 7, which gives an external groove for the reception of the restraining-ring R. The main object of this, however, is to provide broader fulcrums for the tines, and thereby avoid the liability of the edges of the latter at such points slipping past each other when the compression is made; or the same object may be attained by an internal groove, Fig. 8, in which a ring, J, is inserted, the latter constituting the fulcrums of tines T T′. The external bead serves to hold the restraining-band R, as shown in said figure.

The implement may be made, as illustrated by Figs. 5 and 6, as a magazine-holder—that is, so as to contain several crayons of the usual length. In this case I make a contracted orifice, I, between the upper or magazine chamber, so as to permit only a single crayon at a time to escape into the lower chamber formed by the sides of the tines. So soon as one crayon is used up another, L′ or L², is ready to take its place.

When the tines T′ are made of vulcanized rubber or other material soft as compared with metals, I have found it sometimes advisable in order to secure a certain and sufficient hold of the crayon when clamped, (and thus prevent it from being apt to slip up by the pressure against the paper in writing,) to insert small metallic pins or studs $p$, Figs. 2, 5, and 6, near the points of said tines, projecting a little on the inside thereof. If the clamping parts be made of metal, they should be made somewhat sharp, as seen in Fig. 7, or roughened, as in Fig. 8.

Although in referring to the tines I have described T as the long arm and T′ as the short arm of a lever, it is not important to the successful operation of the device which be longer than the other, or whether they happen to be made of equal length from the fulcrums F, so long as they operate to produce the results described.

It will be obvious that the form, style, material, and mechanical detail of the tool and its several parts may be greatly varied. It may be made in a cheap form, "struck up" or spun from suitable sheet metal, or in more expensive and ornamental style of hard rubber alone or other substances, or these in connection with metal.

I wish it to be understood that I am aware of the fact that there have long been in use implements for holding crayons and other articles having a hollow case and spring clamping arms or levers hinged or pivoted to the lower or front end of the case, whereby upon lateral pressure being applied to the arms above their pivotal points the clamping-jaws expand, and upon removal of such pressure they grasp the crayon or other article protruded from the end of the case. Therefore my invention is in so far limited by such state of the art.

I do not herein broadly claim the combination, with a case or holder provided with mechanism for clamping and releasing the crayon, of a lead or crayon having a stop or enlargement thereon to prevent the crayon from falling from the case or holder when the exit-opening of the latter is enlarged; but I reserve the right to claim the same in another application for Letters Patent.

Having thus described my invention, I claim as new and wish to secure by Letters Patent—

1. A crayon-holder with elastic clamping-tines having fulcrum-points of contact, and such tines constituting a part of or being practically an extension of the case or handle, the whole constructed and operating substantially as and for the purpose set forth.

2. In combination with the elastic tines T T', having fulcrum-points of contact, connected at their upper ends, the restraining-band R, as and for the purpose specified.

3. In combination with a crayon-holder having mechanism for clamping and releasing the crayon, the check adjustably secured to the latter, substantially as and for the purpose set forth.

4. As a new article of manufacture, a lead or crayon provided with a sliding check or stop and adapted for use in a case or holder having clamping and releasing mechanism, substantially as and for the purpose described.

JOSHUA PUSEY.

Witnesses:
LOUIS FOERSTER,
WM. H. CARSON.